United States Patent
Chang et al.

(10) Patent No.: US 7,551,327 B2
(45) Date of Patent: Jun. 23, 2009

(54) CONTROLLING APPARATUS AND METHOD FOR IMAGE SCANNING SYSTEM

(75) Inventors: Hui-Huang Chang, Hsinchu (TW); Chuan-Long Huang, Hsinchu (TW); Yueh-Nong Hong, Hsinchu (TW); Hao-Hsiang Huang, Hsinchu (TW)

(73) Assignee: Realtek Semiconductor Corporation, Hsinchu, Taiwan (CN)

( * ) Notice: Subject to any disclaimer, the term of this patent is extended or adjusted under 35 U.S.C. 154(b) by 990 days.

(21) Appl. No.: 11/008,943

(22) Filed: Dec. 13, 2004

(65) Prior Publication Data
US 2005/0141053 A1 Jun. 30, 2005

(30) Foreign Application Priority Data
Dec. 26, 2003 (TW) .............................. 92137181 A

(51) Int. Cl.
H04N 1/40 (2006.01)
H04N 1/04 (2006.01)
H04N 1/46 (2006.01)

(52) U.S. Cl. ................. 358/471; 358/474; 358/475; 358/513

(58) Field of Classification Search ................. 358/471, 358/474, 475, 513, 514; 250/226
See application file for complete search history.

(56) References Cited

U.S. PATENT DOCUMENTS

| 6,069,464 A | 5/2000 | Wu | 318/610 |
| 6,566,647 B1* | 5/2003 | Spears | 250/226 |
| 6,603,512 B2 | 8/2003 | Shimokawa | 348/296 |
| 2002/0080420 A1* | 6/2002 | Yokochi | 358/471 |

* cited by examiner

Primary Examiner—Houshang Safaipour
(74) Attorney, Agent, or Firm—Hoffman Warnick, LLC

(57) ABSTRACT

The present invention provides a controlling apparatus and method for an image scanning system that includes a direct current (DC) motor and an image sensor driven by the DC motor to move. A position signal representative of the position associated of the image sensor is generated and the controlling apparatus and method is performed according to the position signal.

16 Claims, 8 Drawing Sheets

CONTROLLING APPARATUS AND METHOD FOR IMAGE SCANNING SYSTEM

BACKGROUND OF THE INVENTION

1. Field of the Invention

The present invention relates to a controlling apparatus and method for an image scanning system, and especially to a controlling apparatus and method for an image scanning system comprising a direct current (DC) motor.

2. Description of the Prior Art

In the prior art, the image scanning system scans the image by utilizing a stepping motor. To control the stepping motor, a controlling apparatus outputs a phase to enable the stepping motor to feed a micro-step, so as to drive the image sensor to scan the image step by step. Since the controlling apparatus knows the number of outputted phases, the number of forward or backward micro-steps is also realized. Therefore, the controlling apparatus can detect the corresponding position of the image sensor. When the corresponding position is detected, the controlling apparatus can control the exposure time of the image sensor. As long as the controlling apparatus output the phase to the stepping motor at a constant rate, the image sensor driven by the stepping motor moves at a corresponding constant rate.

Referring to FIG. 1, FIG. 1 shows the timing signals for controlling an image sensor. A contact image sensor (CIS) comprises red, green, and blue color channels. A start signal SS comprises a plurality of start pulses SP used to sequentially trigger each of the color channels of the CIS, so as to sense the image data. The control signals 12, 14, and 16 respectively control the red, green, and blue light emitting diode (LED) of the CIS to sense the image data. The image data sensed by the CIS is then read out sequentially according to the read-out timing sequence 18 as shown in FIG. 1. The way to control the charge coupled device (CCD) image sensor driven of the stepping motor is similar to the above mentioned way to control the CIS, so the related description is neglected.

As the demand for a scanner with improved scanning speed increases, a stepping motor with greater twist force is necessary. However, such kind of stepping motor usually has big volume. Hence, a DC (direct current) motor replaces the stepping motor and the following problem is that the position of the image sensor driven by the DC motor is more difficult to control. Accordingly, it is quite important to control the position of the image sensor and the timing to sense the image, so as to make sure of the quality of the scanned image.

SUMMARY OF THE INVENTION

Therefore, an objective of the present invention is to provide a controlling apparatus and method for controlling an image scanning system comprising an image sensor driven by a direct current (DC) motor.

According to one preferred embodiment of the present invention, a position signal corresponding to the position of the image sensor is generated. The controlling apparatus of the present invention comprises a clock control logic. The clock control logic is used for generating a plurality of start pulses and exposure signals according to the position signal. Moreover, the clock control logic outputs at least one read signal to the image sensor for outputting an image scanning. Each start pulse mentioned above represents the start of a scanning period of the image sensor.

According to another preferred embodiment of the present invention, the controlling apparatus further comprises a timer. The timer is used for counting a time interval of the scanning period.

According to another preferred embodiment of the present invention, the controlling apparatus further comprises a judgment logic. The judgment logic is used for judging whether the position signal occurs only once between two adjacent start pulses. If the judging result is yes, the image scanning data is determined to represent an effective image scanning data within the scanning period.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
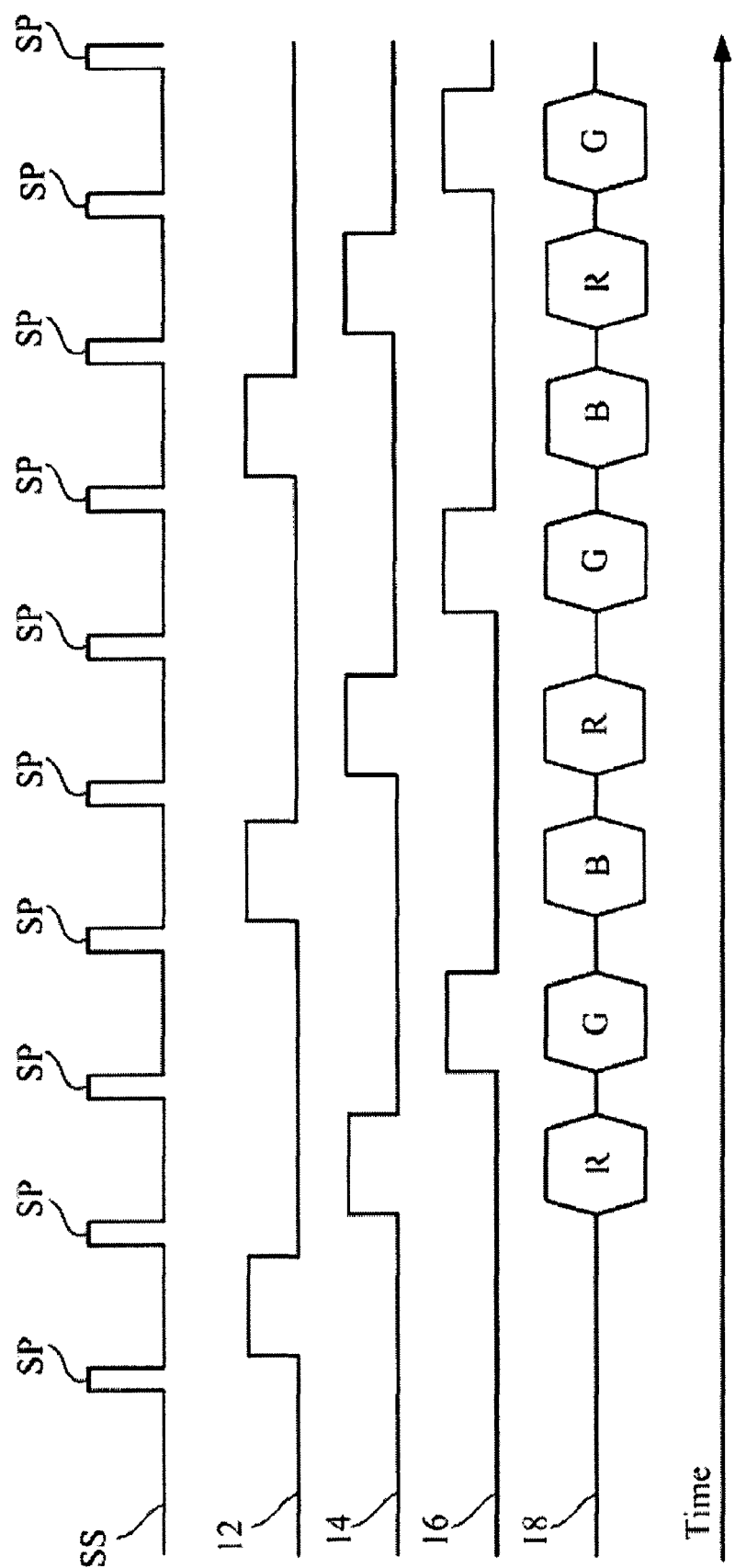
FIG. 1 is a timing diagram of the control timing for triggering the image sensor according to the prior art.
Figure 2A:
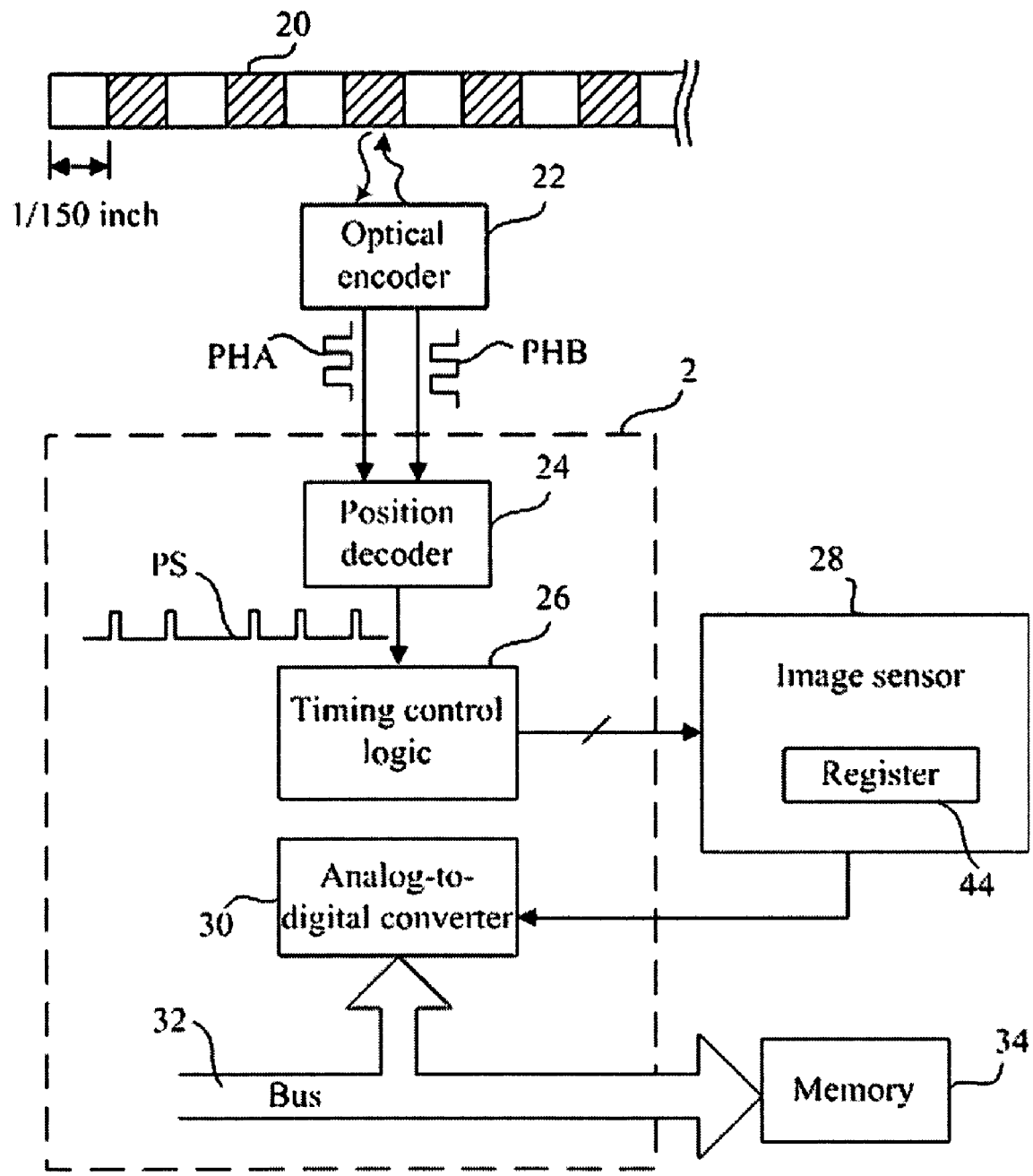
FIG. 2A is a schematic diagram of the peripherals of the timing apparatus according to the present invention.
Figure 2B:
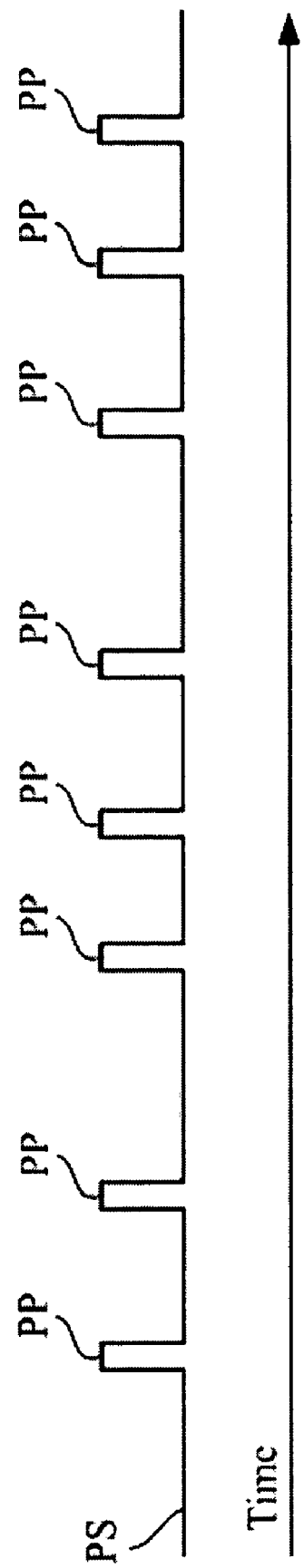
FIG. 2B is a schematic diagram of the position signal PS shown in FIG. 2A.

Referring to FIG. 2A, FIG. 2A is a schematic diagram of the peripherals of the timing apparatus according to the present invention. An encoder strip 20 is cooperated with an optical encoder 22 to detect the position of the image sensor. In general, there is a criterion on the encoder strip 20 to be a reference for dots per inch (dpi) subsequently. For example, the criterion on the encoder strip 20 is $1/150$ inch to be the reference for 150 dpi subsequently. The optical encoder 22 transmits a signal PHA and a signal PHB to a position decoder 24, wherein the difference between the signal PHA and the signal PHB is $1/4$ phase. The position decoder 24 processes the received signals PHA and PHB to output a position signal PS to be a reference for 600 dpi. The related prior art is disclosed in U.S. Pat. No. 4,639,884.

The function block 2 marked by dotted lines shown in FIG. 2A is what the controlling apparatus of the present invention covers. Besides, the time intervals between the position pulses PP of the position signal PS is not constant, reflecting that the image sensor 28 is driven by a DC (direct current) motor.

The advantage and spirit of the invention may be understood by the following preferred embodiments.

Figure 3A:
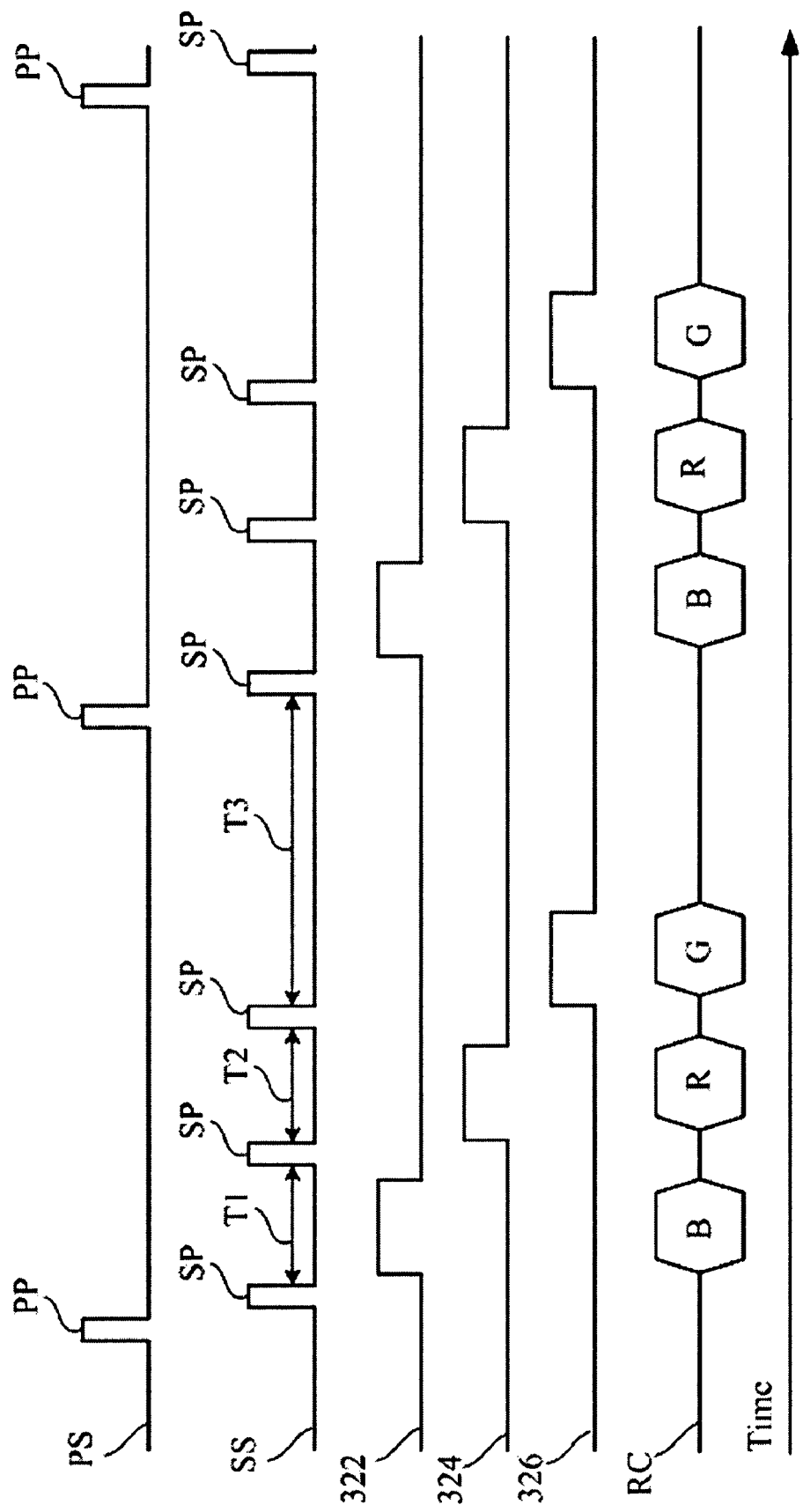
FIG. 3A is a control timing diagram of the first mode according to the present invention.

First, the timing control for the CIS (Contact Image Sensor) is described. As shown in FIG. 2A, the timing control logic 26 is designed for the typical CIS having three color channels according to a preferred embodiment of the present invention, and the related control timing sequence is shown in FIG. 3A. This preferred embodiment is referred as the first mode in the following. As shown in FIG. 3A, the timing control logic 26 is controlled by each of the position pulses PP to generate start pulses SP, exposure signals 322, 324, and 326, and read-out pulses R, G, and B. The pulses of the exposure signals 322, 324, and 326 are outputted by the timing control logic 26 to turn on the red, green, and blue LED of the CIS 28 respectively and sequentially, so as to sense images. Meanwhile, the timing control logic 26 outputs the corresponding read-out pulse RC to output the data sensed by the CIS to an analog to digital converter (ADC) 30. The ADC 30 translates the data into digital form and transmits the digital data to a memory 34 through a bus 32.

In the first mode, a first time interval T1 between start pulses SP is equal to a second time interval T2 between start pulses SP. A third time interval T3 between start pulses SP is inconstant. Otherwise, the read-out pulses R, G, and B respectively correspond to the first time interval T1, the second time interval T2, and the third time interval T3. Since the image sensor is a CIS, the lengths of the pulses of the exposure signals 322, 324, and 326 can be controlled by the timing control logic 26. Therefore, the difference between the time intervals T1, T2, and T3 will not affect the quality a lot, and the scanning system of the first mode may be adapted to high scanning speed.

Figure 3B:
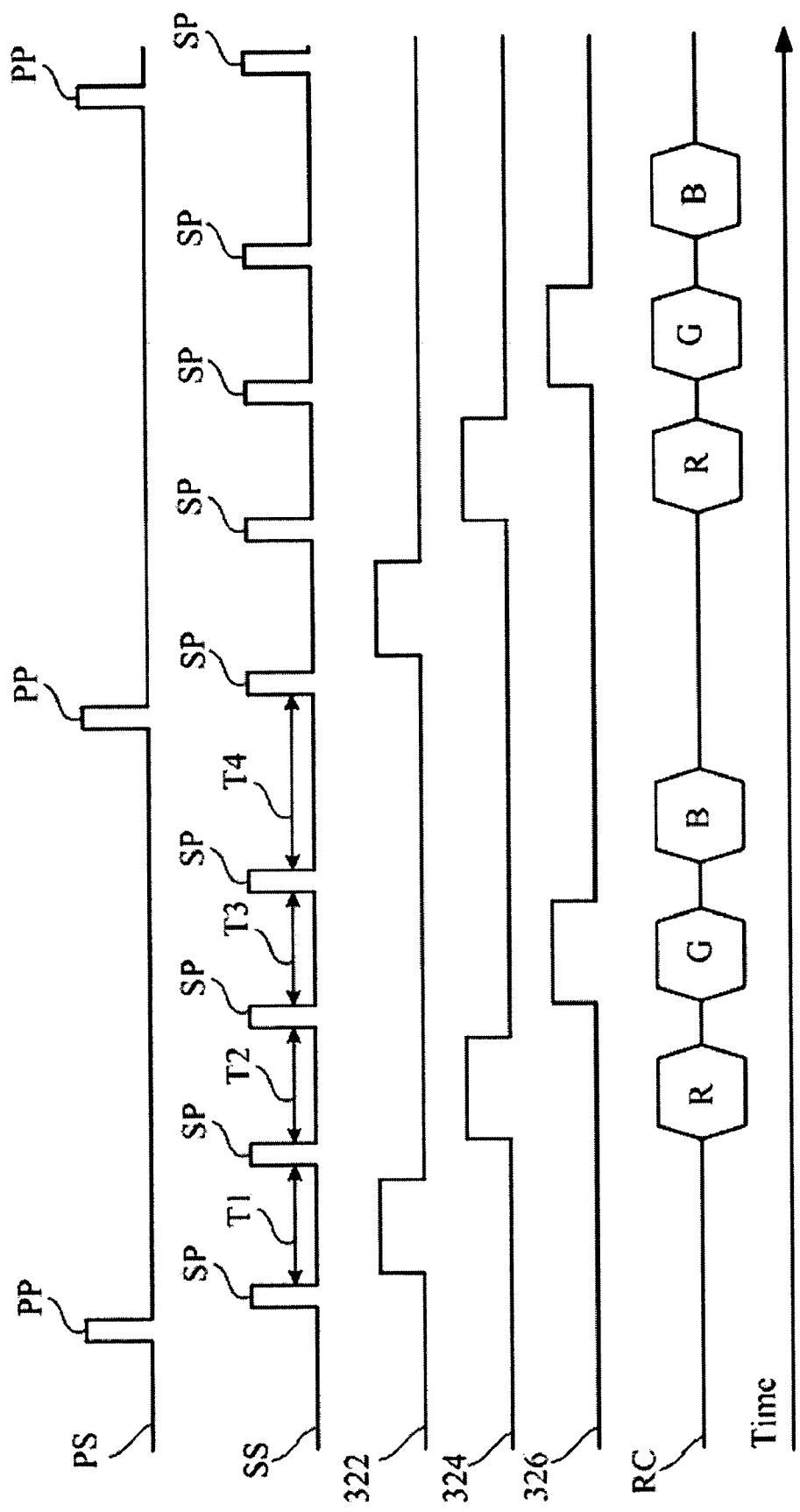
FIG. 3B is a control timing diagram of the second mode according to the present invention.

Please refer to FIG. 3B which shows another preferred embodiment referred as the second mode in the following. As shown in FIG. 3B, the first, second, and third time interval T1, T2, and T3 between the start pulses SP are equal to each other while the fourth time interval T4 is inconstant. The lengths of the pulses of the exposure signals 322, 324, and 326 are equal to each other in the second mode. Moreover, the scanning system of the second mode may be adapted to high scanning quality.

In the following description, a CCD is used as the image sensor and the timing control sequence comprising the timing signal for triggering the CCD and the related signals for controlling the CCD is described.

Figure 4A:
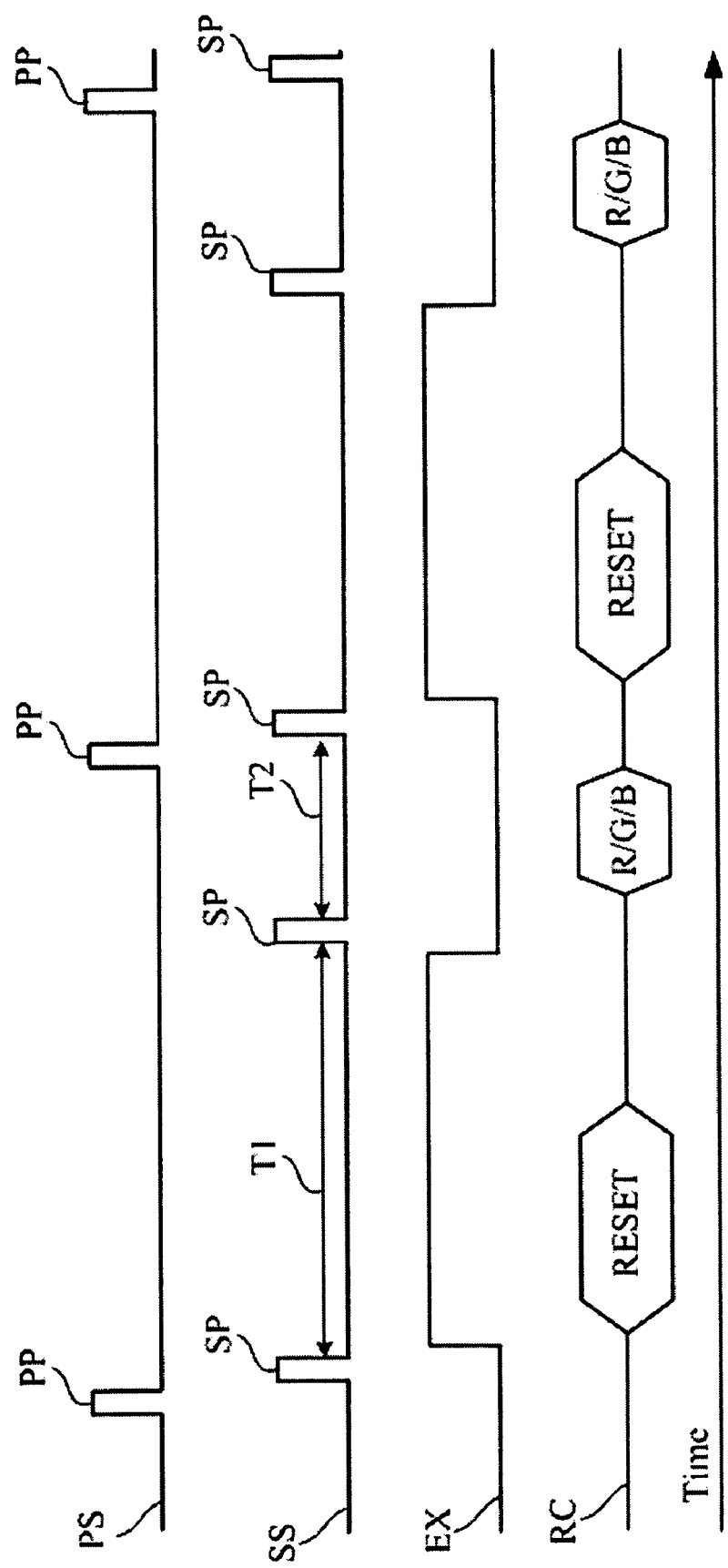
FIG. 4A is a timing diagram of the control timing of the second preferred embodiment according to the present invention.

A preferred embodiment for the CCD image sensor is referred as the third mode in the following. As shown in FIG. 2A and FIG. 4A, the timing control logic 26 provides constant exposure time as in the second mode and the timing control logic 26 is controlled by each of the position pulses PP of the position signal PS, so as to generate start pulses SP. The first start pulse SP is used for triggering the CCD 28 to perform the exposure, so as to sense the image of the object being scanned. The timing signal EX for controlling the exposure of the CCD 28 is shown in FIG. 4A. Accordingly, the first time interval T1 between the first start pulse SP and the second start pulse SP is constant, and the second time interval T2 between the second start pulse SP and the next first start pulse SP is inconstant. Furthermore, the read-out pulses R/G/B carried by the signal RC are outputted immediately after the timing control logic 26 outputs the second start pulse SP. During the period of the pulses R/G/B, the data stored in the buffer 44 is transmitted to the memory 46. In this embodiment, a reset pulse may be outputted during the period of the first time interval T1 to reset the CCD 28.

Figure 4B:
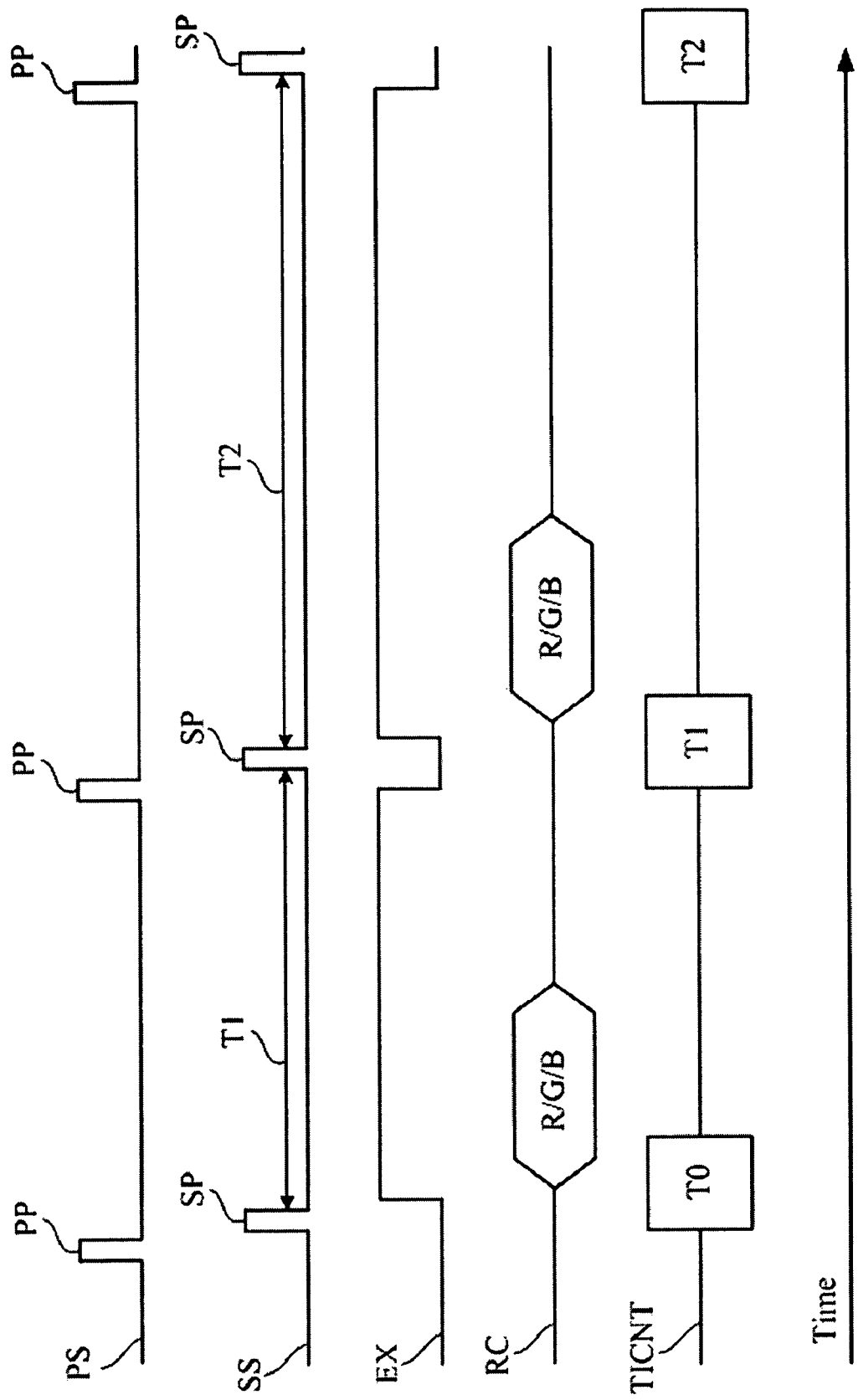
FIG. 4B is a control timing diagram of the fourth mode according to the present invention.

In another preferred embodiment, the timing control logic 26 is designed to providing inconstant exposure time for the typical CCD, and the related control timing sequence is shown in FIG. 4B. This preferred embodiment is referred as the fourth mode in the following. As shown in FIG. 4B, the pulse of the signal EX represents the period of exposure time of the CCD 28, and the pulse is determined by the time interval between adjacent start pulses. The period of each exposure time of the CCD 28 is inconstant in the fourth mode, that is to say the time interval T1 not equal to the time interval T2. In the fourth mode, the controlling apparatus 2 can further comprise a timer (not shown) for recording the time interval between two adjacent start pulses SP and for outputting a signal TICNT as shown in FIG. 4B. The marks T1 and T2 on the signal TICNT represent the time interval T1 and the time interval T2 recorded by the timer respectively. Furthermore, the fourth mode may compensate the image data linearly according to the length of exposure time.

Figure 5:
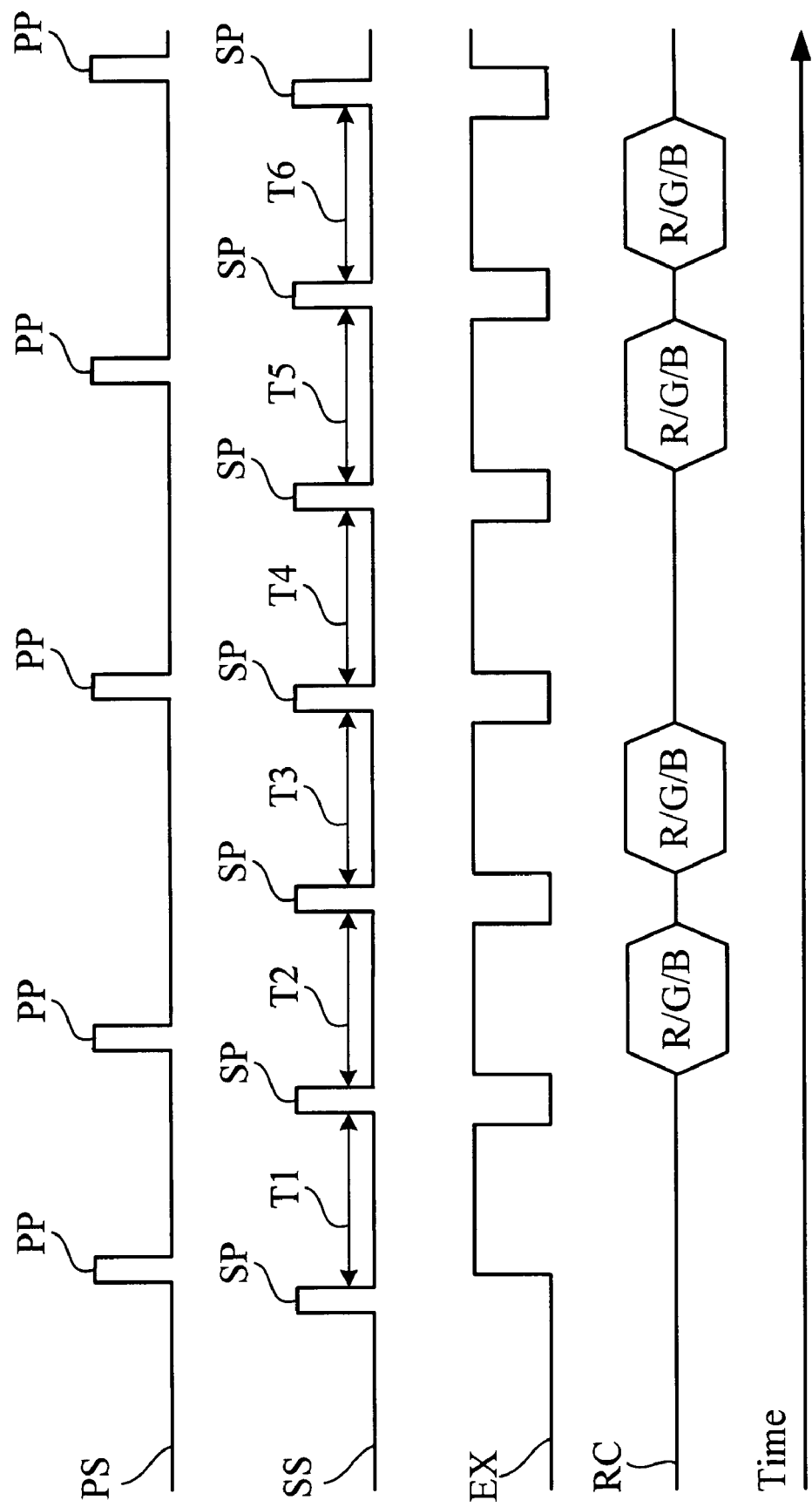
FIG. 5 is a control timing diagram of the fifth mode according to the present invention.

The exposure and read-out timing of the image sensor do not always have to be controlled by the position signal PS. Referring to FIG. 5 (the fifth mode), the time interval T1~T6 between the start pulses SP of the start signal SS is constant and each pulse of the timing signal EX is constant, too. Meanwhile, the time interval of the position signal is inconstant. In the fifth mode, the controlling apparatus 2 can further comprise a judgment logic (not shown). The judgment logic judges whether the position signal PP occurs only once in a time interval T1, T2, . . . , or T6. If the judging result is yes, the image data corresponding to the time interval is accepted. If the judging result is no, the judgment logic determines that the image data corresponding to the time interval must be rejected, that is to say, the image data corresponding to the repeated scanning line. Accordingly, the image data corresponding to the time intervals T1, T2, T4, and T5 shown in FIG. 5 is accepted and the image data corresponding to the time intervals T3 and T6 shown in FIG. 5 is rejected.

Table 1 shows the characteristics of the above-mentioned five modes. The information listed in table 1 is for example, not restriction for the present invention.

TABLE 1

| Mode | Suitable image sensor | Quality of scanning image | Scanning speed |
| --- | --- | --- | --- |
| First mode | CIS | Good | Fast |
| Second mode | CIS | Better than first mode | ⅓ scanning time more than first mode |
| Third mode | CIS | Better than fourth mode and fifth mode | Slower than fifth mode |
| Fourth mode | CIS | Good | Slower than fifth mode |
| Fifth mode | CIS | Good | Fast |

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A control method for controlling an image scanning system comprising an image sensor driven by a DC motor, a position signal representing the position of the image sensor, the control method comprising the steps of:

outputting a start signal to the image sensor;

outputting at least one exposure signal to the image sensor to perform image scanning; and reading an image scanning data outputted by the image sensor, wherein the position signal comprises a plurality of position pulses, the start signal comprises a plurality of start pulses generated according to the position pulses and the exposure signal comprises a plurality of exposure pulses generated during a time interval between adjacent start pulses.

2. The control method of claim 1, wherein the image sensor is a contact image sensor (CIS).

3. The control method of claim 2, wherein the exposure signals control a plurality of light emitting diodes (LED) of the image sensor, respectively.

4. The control method of claim 2, wherein the exposure signals comprise a red, a green, and a blue exposure signal.

5. The control method of claim 1, wherein the image sensor is a charge coupled device (CCD).

6. The control method of claim 1, wherein the length of each of the exposure pulses is adjustable.

7. The control method of claim 1, wherein the image scanning data is compensated in accordance with the time interval.

8. A control method for controlling an image scanning system comprising a direct current (DC) motor, an image sensor driven by the DC motor, and a position signal representing corresponding position of the image sensor, the control method comprising the steps of:

outputting a start pulse, representative of the start of a scanning period, to the image sensor;

outputting at least one exposure signal to the image sensor, so as to perform image scanning; and if the position signal occurs only once between the adjacent start pulses, reading an image scanning data outputted by the image sensor; wherein the exposure signal comprises a plurality of exposure pulses generated during a time interval between adjacent start pulses.

9. The control method of claim 8, wherein the image sensor is a charge coupled device (CCD).

10. A control device for an image scanning system which comprises a direct current (DC) motor, an image sensor driven by the DC motor to move, and a position signal representative of a plurality of relative positions of the image sensor, the control device comprising:

a clock control logic for generating at least one start pulse according to the position signal and at least one exposure signal to the image sensor, and outputting a read signal to the image sensor to output an image scanning data;

wherein the start pulse is representative of the start of a scanning period of the image sensor and the exposure signal comprises a plurality of exposure pulses generated during a time interval between adjacent start pulses.

11. The control device of claim 10, wherein the image sensor is a contact image sensor (CIS).

12. The control device of claim 11, wherein the exposure signals control a plurality of light emitting diodes (LED) of the image sensor, respectively.

13. The control device of claim 12, wherein the exposure signals comprise a red, a green, and a blue exposure signal.

14. The control device of claim 10, wherein the image sensor is a charge coupled device (CCD).

15. The control device of claim 10, wherein the length of each of the exposure pulses is adjustable.

16. A control device for an image scanning system which comprises a direct current (DC) motor, an image sensor driven by the DC motor to move, and a position signal representative of a plurality of relative positions of the image sensor, the control device comprising:

a clock control logic for generating at least one start pulse according to the position signal and at least one exposure signal to the image sensor, and outputting a read signal to the image sensor to output an image scanning data; and a timer for counting a time interval between adjacent start pulses;

wherein the start pulse is representative of the start of a scanning period of the image sensor and the image scanning data is compensated by the control device in accordance with the time interval counted by the timer.

* * * * *